Figure 1:
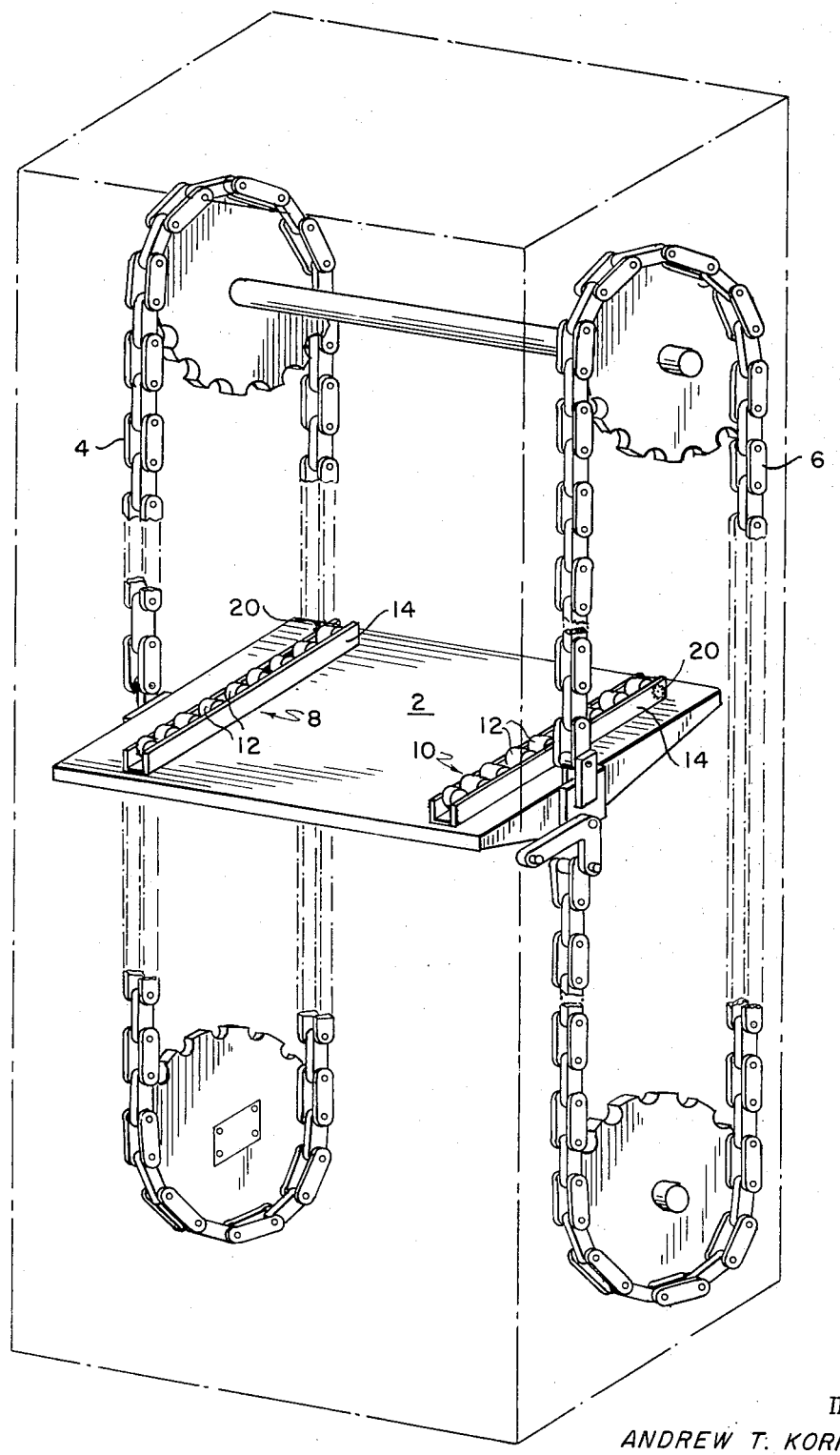

United States Patent [19]

Kornylak Andrew T.

[11] 3,759,364
[45] Sept. 18, 1973

[54] LOADING CONVEYOR FOR ELEVATOR

[76] Inventor: Andrew T. Kornylak, 400 Heaton St., Hamilton, Ohio 45011

[22] Filed: Aug. 15, 1968

[21] Appl. No.: 752,912

[52] U.S. Cl. ................................. 198/20, 198/158
[51] Int. Cl. ............................................ B65g 17/34
[58] Field of Search ............................ 198/20, 158; 214/16.16 A

[56]     References Cited
        UNITED STATES PATENTS

| 1,133,565 | 3/1915  | Kankkonen | 198/158 X |
| 2,663,446 | 12/1953 | Romain    | 214/16.16 A |

Primary Examiner—Edward A. Sroka
Attorney—Jay M. Cantor

[57]     ABSTRACT

A device for transferring a pallet load between a horizontal and vertical conveyor or elevator which can compensate for large differences in alignment between the load supporting surfaces of the conveyors and which supports the trays of the vertical conveyor during the transfer of the load. A pair of wedges associated with the horizontal conveyor are shifted under the tray after the vertical conveyor is stopped at a transfer station to support the tray during transfer of the load. The horizontal conveyor is supported by the wedges as it is moved into transfer contact with the trays.

5 Claims, 6 Drawing Figures

INVENTOR
ANDREW T. KORNYLAK

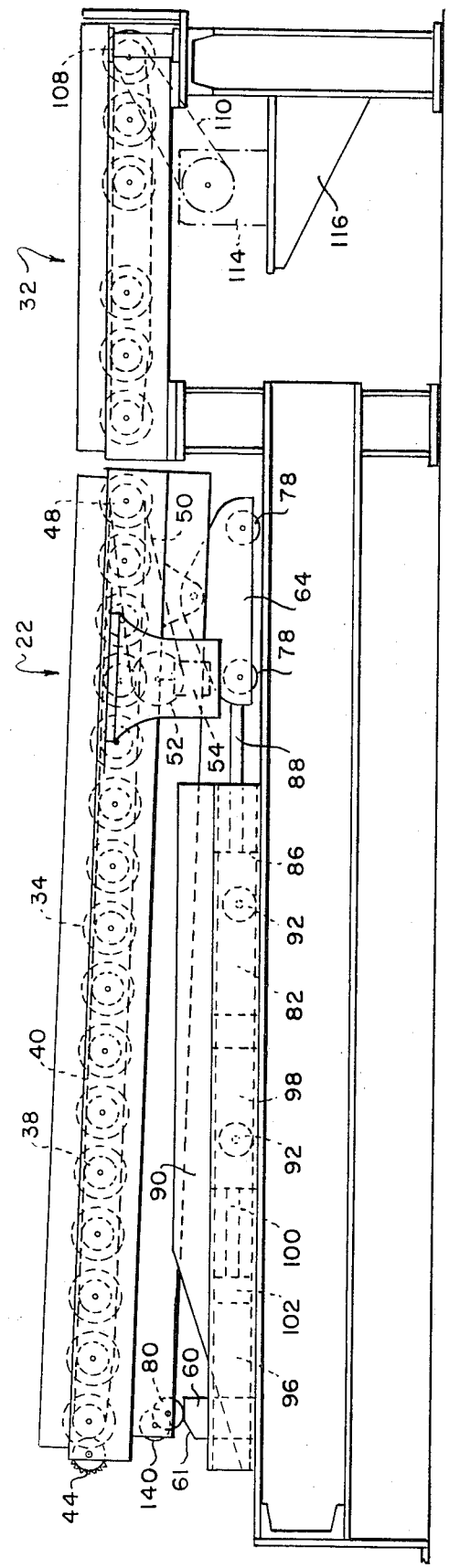
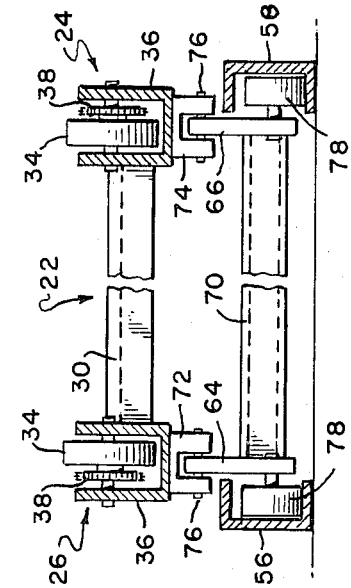
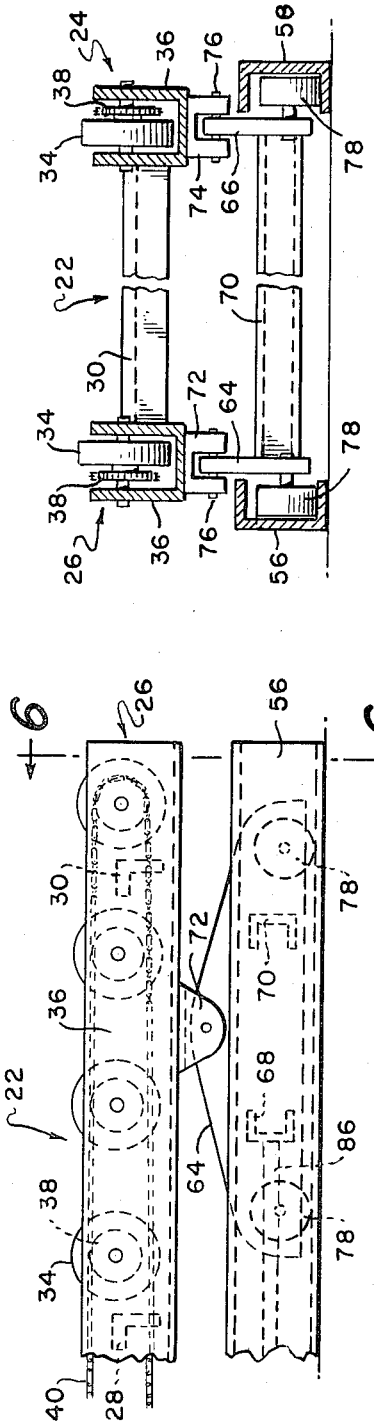
FIG. 4.
FIG. 6.
FIG. 5.
INVENTOR
ANDREW T. KORNYLAK
BY Harold L. Halpert
Agent

LOADING CONVEYOR FOR ELEVATOR

This invention relates to a conveyor and more particularly to a conveyor for use in loading a vertically movable elevator and other types of vertical conveyors.

In U.S. Pat. No. 3,365,052 there is disclosed a material handling device comprising a pair of parallel sprocket chains carrying a plurality of shelves pivotally arranged thereon. The shelves are horizontally arranged to carry material between vertically disposed stations and are pivoted into a vertical position while moving from one end station to the other end Station. It has been found that the shelves do not stop in exact alignment with the loading and unloading stations and the mechanical devices used for loading and unloading cannot be used till the alignment of shelves and stations is within certain close tolerances. It has also been found that the pivot structure for connecting the shelves to the chains and guiding them in the tracks is burdened during loading and unloading whereby to promote excessive wear.

It is an object of this invention to provide a mechanical device for loading and unloading an elevator as aforesaid in which the alignment of the shelves and stations does not require a fine degree of tolerance.

It is a further object of this invention to provide a device as aforesaid in which the shelves are supported, during loading and unloading, in a manner to reduce the loading on the pivot structure.

Figure 2:
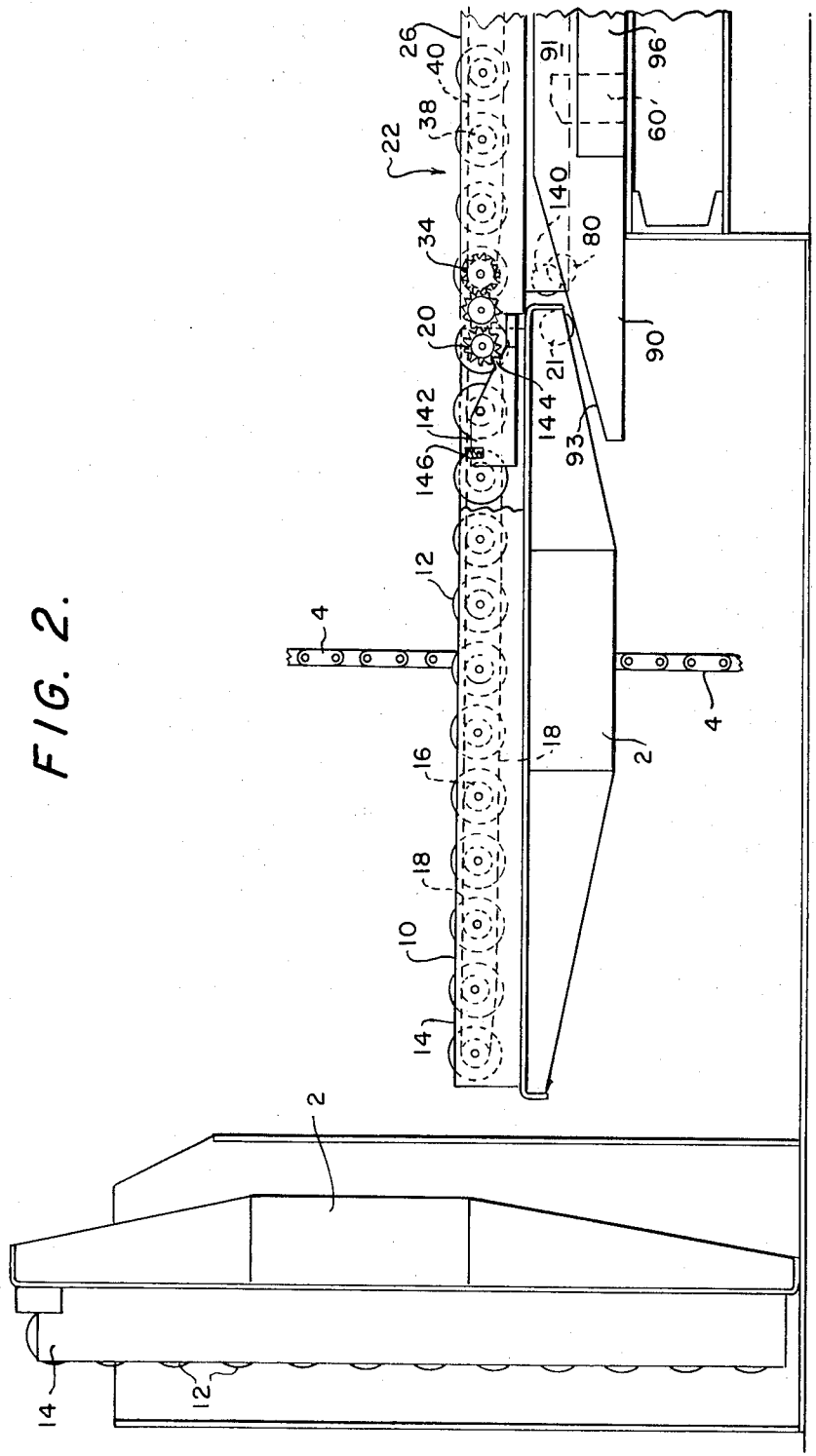
Figure 3:
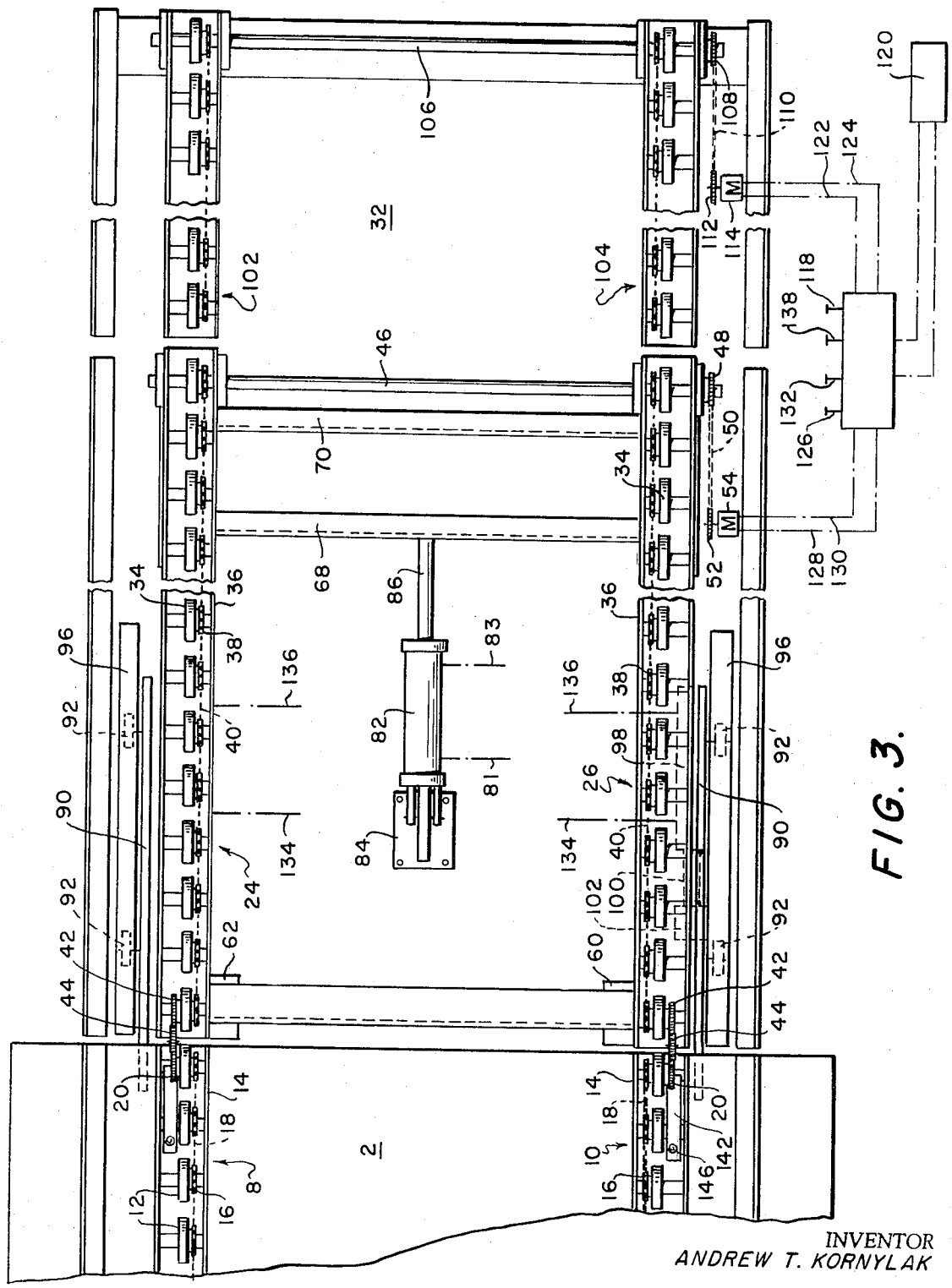

These and other objects of the invention will become manifest upon reading the following description in conjunction with the accompanying diagrammatic drawings in which:

FIG. 1 is a perspective view of the elevator of this invention,

FIG. 2 is a view showing the support for a shelf during the loading and unloading thereof, FIG. 3 is a plan view of the mechanical device in the loading and unloading position, FIG. 4 is an elevational view showing the mechanical device in the storage position, FIG. 5 is an enlarged view showing the carriage mechanism for a conveyor device, and FIG. 6 is an end view taken on the line 6—6 of FIG. 5.

In FIG. 1 there is shown in a broken view a single load carrying shelf 2 pivotally mounted on sprocket chains 4,6. The pivotal mounting is described in great detail in the aforementioned U.S. Pat. No. 3,365,052 to Andrew T. Kornylak but other pivot mountings could be used if desired. The chains are driven in a manner disclosed in said patent. A pair of roller tracks 8,10 are mounted on each shelf for supporting the material to be transferred between vertically arranged stations. Each track comprises a plurality of rollers 12 rotatably mounted in a channel 14. A sprocket 16 is secured to each roller and a chain 18 is trained over the sprockets to drivably interconnect the rollers 12. A gear 20 is secured to the end rollers of each track for supplying power to rotate the rollers through the chain and sprockets. A pair of rollers 21 are rotatably supported at the edge zone of each shelf for a purpose to be described below.

A transfer conveyor 22 comprising a pair of tracks 24,26 secured together by members 28,30 is shiftably mounted to move between a position adjacent a loading conveyor 32 as shown in FIG. 4, to a position adjacent the elevator as shown in FIG. 2, to convey the material comprising the load between the loading conveyor and the appropriate shelf of the elevator. Each track comprises a plurality of rollers 34 rotatably mounted in a channel 36. A sprocket 38 is secured to each roller and a chain 40 is trained over the sprockets to drivably interconnect the rollers. A gear 42 is secured to the end rollers of each track for receiving power from the chain and sprocket drive 40,38. An idler gear 44 is rotatably mounted on each track in permanent engagement with the gears 42. When the conveyor 22 is shifted into the position illustrated in FIG. 3, gears 44 are brought into engagement with gears 20 to drivingly interconnect the rollers of the tracks.

The power for driving the rollers is provided by a chain and sprocket mechanism driven by a motor carried by the conveyor 22. A shaft 46 is rotatably mounted by tracks 24,26 and has secured in driving engagement therewith the end rollers and sprockets of the tracks. A sprocket 48 is secured to one end of shaft 46 and is driven by a chain 50 trained over a sprocket 52 rotatably mounted on track 26 and driven by a fluid motor 54 mounted on the track.

The channels 36 are pivotally mounted on a carriage which is longitudinally shiftable along guides 56,58 and are supported for travel over ramps 60,62. The carriage comprises a pair of plates 64,66 fixedly secured to channels 68,70 to provide a rigid frame. Channels 72,74 are secured to channels 36 and are pivotally mounted on plates 64,66 by means of pins 76. Wheels 78 are rotatable in and guided by the channels 56,58 and support the frame for the longitudinal shifting motion. Supporting rollers 80 are secured to the other ends of channels 36 to support the channels for movement over the ramps. A cylinder 82 is pivotally mounted on a support 84 and reciprocably mounts a piston 86 having a rod 86 flexibly secured to channel 68 to compensate for misalignment of the parts. The piston and cylinder operates as a fluid motor to longitudinally shift the conveyor 22 as heretofore described.

A pair of wedges 90 are supported by wheels 92 for longitudinal shifting from a retracted position as shown in FIGS. 3 and 4 to a support position illustrated in FIG. 2. The wheels are constrained for guided movement by channel shaped guides 96 and support the wedges against tipping when moved into supporting position for the shelf. A fluid motor comprising a cylinder 98 having a piston and a piston rod 100 is connected to each of the wedges by a flange 102.

The loading conveyer comprises a pair of tracks 102,104 similar to tracks 24,26. A shaft 106 is rotatably mounted by the tracks and is drivingly connected to the end rollers and sprockets of tracks 102,104 in the same manner as the end rollers and sprockets of tracks 24,26. The shaft has secured thereto at one end a sprocket 108 driven by a chain 110 trained over a sprocket 112 powered by a fluid motor 114 carried by a shelf 116.

In loading operation, a load is placed on the loading conveyor 32 and motor 114 is energized by shifting handle 118 to connect a source of pressure fluid 120 to the motor by conduits 122,124. The motor operates the chain and sprocket device 108,110,112 to rotate the rollers of the loading conveyor to move the load thereon to the transfer conveyor 22. Operation of handle 126 energizes motor 54 by connecting the source of pressure fluid 120 to the motor by conduits 128,130. The motor operates the chain and sprocket device 48,50,52 to rotate the rollers 34 of the loading conveyor 22 to move the load toward the elevator. The handle is actuated to stop the load while it is supported on the conveyor 22. Operation of handle 132 will supply pressure fluid from the source 120 through conduits 134,136 to the cylinder 98 to move the wedges 90 into the position shown in FIG. 2 wherein to engage the rollers 21 for supporting the shelf. Handle 138 is then operated to supply pressure fluid from source 120 to cylinder 82 through the conduits 81,83 to shift conveyor 22 toward the elevator. The initial movement of conveyor 22 from the position illustrated in FIG. 4 will cause rollers 80 to roll down the inclined surfaces 61 of wedges 60. As rollers 80 move down the inclined surface the weight on the rollers 80 is transferred to rollers 140 carried by conveyor 22. Rollers 140 are supported by the wedges 90 as the rollers move over the horizontal surface 91 and the sloping surface 93 to align the tracks of the transfer conveyor with the tracks on the shelf and to engage gears 20 and 44. By again actuating handle 126 rollers 34 are again rotated to move the load toward the elevator. Rollers 12 are activated by the gear train 20,42,44 and the chain and sprocket to move the load onto the shelf.

A locking device comprising a lever 142 pivotally mounted on each of the channels 14 carries a tooth 144 for engagement between the teeth of gears 20. The lever is biased by a spring 146 to urge tooth 144 into locking engagement with gear 20 whereby to lock the rollers against rotation to thereby prevent shifting of the load.

The shifting of the load by manipulation of handles 118,126,132, and 138 has been described in detail but it is to be understood that I contemplate the use of automatic devices to accomplish this purpose as well as to unload the elevator at the unloading station.

Having described my invention I desire it to be understood that further modifications and changes may be made within the skill of the art.

I claim

1. A material handling device comprising a shelf, means for moving said shelf between a pair of vertically located stations, means for transferring material to and from the shelf at said stations, and means shiftable into contact with an edge zone of the shelf for supporting said shelf during the transfer of the material, wherein the means for transferring the material comprises a pair of roller tracks mounted on the shelf, means drivably interconnecting at least some of the rollers of each track for conveying the material along the shelf, a transfer conveyor comprising a pair of roller tracks shiftably mounted at each station for movement toward and away from the shelf, means drivably interconnecting at least some of the rollers of each track of said transfer conveyor for conveying material along the transfer conveyor, means for shifting the tracks of said transfer conveyor into alignment with the tracks on the shelf, and means for drivingly interconnecting the drivably interconnected rollers of the tracks mounted on the shelf with the drivably interconnected rollers of the transfer conveyor.

2. A device as defined in claim 1 wherein the means for drivably interconnecting the rollers of each track comprises a sprocket secured to each of the at least some of the rollers and a chain trained over the sprockets.

3. A device as defined in claim 2 wherein the means for drivably interconnecting the rollers comprises a drive gear carried by each of said aligned tracks and drivably secured to one of said drivably interconnected rollers of the associated track, an idler gear carried by one of said tracks in permanent engagement with one of said drive gears and in separable engagement with the other of said drive gears.

4. A device as defined in claim 1 wherein said means for shifting the tracks comprises a carriage, means pivotally mounting one end of each track on the carriage, and a motor for driving the carriage.

5. A material handling device comprising a shelf, means for moving said shelf between a pair of vertically located stations, means for transferring material to and from the shelf at said stations, and means shiftable under and into contact with an edge zone of the shelf for supporting said shelf during the transfer of the material, the means for supporting the shelf comprises a wedge, said transferring means comprises a transfer conveyor shiftable toward and away from the shelf, and means supporting said conveyor on said wedge.

* * * * *